US007133123B1

United States Patent
Lei et al.

(10) Patent No.: US 7,133,123 B1
(45) Date of Patent: Nov. 7, 2006

(54) LASER OBSTACLE AVOIDANCE APPARARTUS

(75) Inventors: Jonathan S. Lei, Springfield, VA (US); Bradley W. Schilling, Fredericksburg, VA (US); Dallas N. Barr, Woodbridge, VA (US); John E. Nettleton, Fairfax Station, VA (US); Michael M. Quarles, Stafford, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 253 days.

(21) Appl. No.: 10/833,634

(22) Filed: Apr. 27, 2004

(51) Int. Cl.
 *G01C 3/08* (2006.01)
(52) U.S. Cl. .................................. 356/4.01
(58) Field of Classification Search ................ 356/4.01
 See application file for complete search history.

(56) References Cited

U.S. PATENT DOCUMENTS 5,870,180 A * 2/1999 Wangler .................... 356/4.01

* cited by examiner

*Primary Examiner*—Thomas H. Tarcza
*Assistant Examiner*—Luke D. Ratcliffe
(74) *Attorney, Agent, or Firm*—Andrew Romero

(57) ABSTRACT

The laser obstacle avoidance device of the present invention includes an optical head which includes a laser source which produces a laser signal, crossed cylindrical lenses and through which the laser signal is transmitted, a transceiver including a receiving lens through which a reflected laser signal is received by the transceiver, a receiver and a line filter through which the reflected laser signal is filtered, and scanners which receive the reflected laser signal; and control electronics optically connected to the optical head, wherein the control electronics comprise scanner driver electronics, range processor electronics, power converters, and a display all which produce an x-y display of the terrain scanned by the laser signal wherein the X-axis is driven by a scanner position output and the Y-axis by range data. The system was designed to avoid hazards with emphasis simplicity and low cost. The device has been employed in the field to collect data from natural and man-made objects. A simple, single scan line, range discontinuity detection program has been written and tested. The next step in the process is to interface the output of the processor with driver's display indicating the location of the potential hazard for the operator's closer scrutiny.

8 Claims, 6 Drawing Sheets

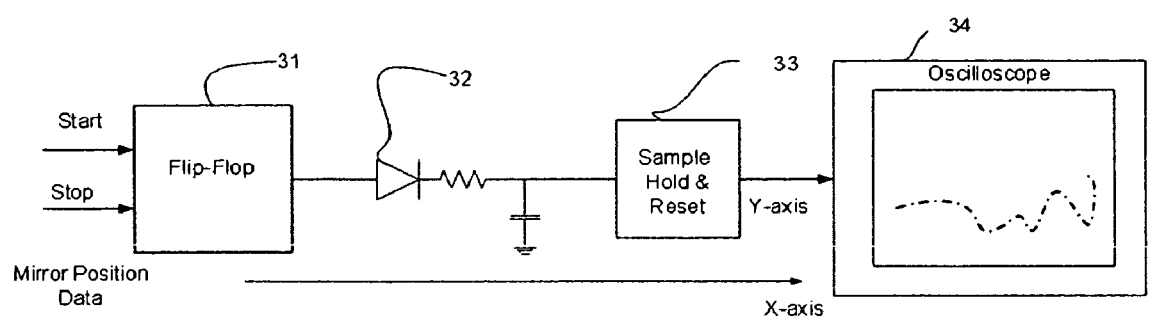
Figure 3
Figure 4
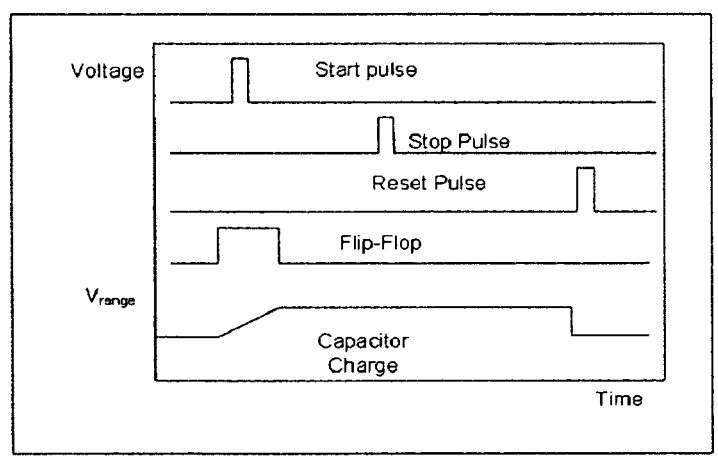

Gravel Parking Lot

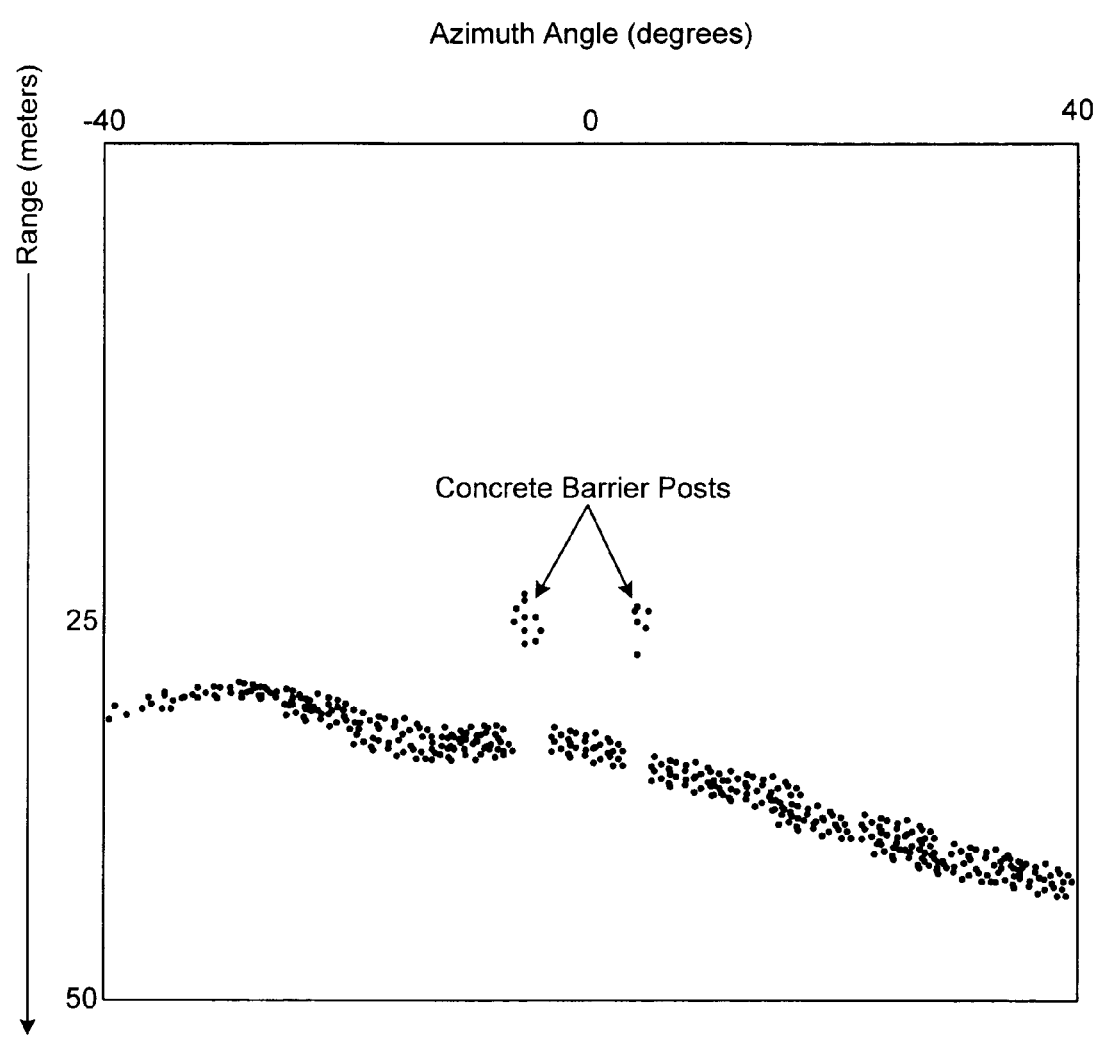

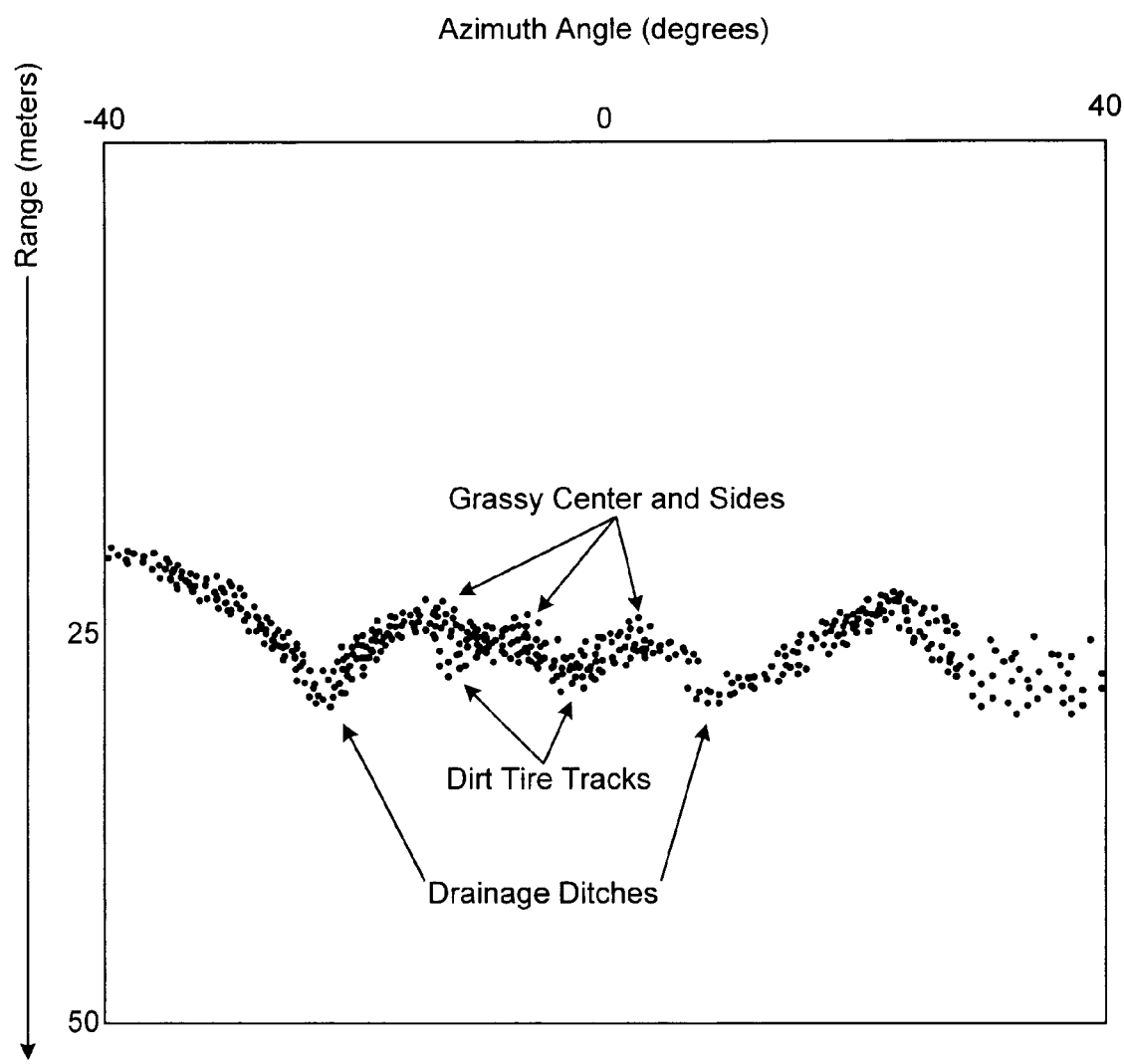

LASER OBSTACLE AVOIDANCE APPARARTUS

GOVERNMENT INTEREST

The invention described herein may be manufactured, used, sold, imported, and/or licensed by or for the Government of the United States of America.

FIELD OF INTEREST

This invention generally relates to light detection and ranging systems, particularly systems capable of detecting obstacles in the path of a moving ground vehicle.

BACKGROUND OF THE INVENTION

Laser based obstacle avoidance systems have relied on imaging techniques in which the range is measured to every pixel in a field of view ahead of the vehicle. The result is a three dimensional image requiring intensive digital image processing to locate both obstacles and a clear path for the vehicle to traverse. Using this sensor the vehicle can autonomously negotiate unfamiliar terrain. The disadvantage is that both the laser radar and the processor are complex and expensive.

Accordingly, there is a need to have a simple and inexpensive laser obstacle avoidance system. The present invention addresses this need.

SUMMARY OF THE INVENTION

Accordingly, one object of the present invention is to provide a simple and inexpensive laser obstacle avoidance device.

This and other objects of the present invention are achieved by providing a laser obstacle avoidance device (LOAD) which is a compact, high pulse repetition frequency (PRF), diode laser based radar that scans forty-degree wide horizontal line in front of the vehicle and measures the range to the terrain with a resolution of 15 cm. Along with the optical system, a novel analog range processor is employed that also reduces the cost, size, and weight of the sensor. Unlike autonomous land navigation systems which are three dimensional ranging imaging devices with significant processing required, the objective of the LOAD system is to use a person in the loop approach requiring simple one line processing. When a significant range discontinuity is detected in a scan line, the driver will be warned to examine the area before proceeding.

The laser obstacle avoidance device includes an optical head which includes a laser source which produces a laser signal, crossed cylindrical lenses 21a and 21b through which the laser signal is transmitted, a transceiver including a receiving lens through which a reflected laser signal is received by the transceiver, a laser signal is filtered, and scanners which receive the reflected laser signal; and control electronics optically connected to the optical head, wherein the control electronics comprise scanner driver electronics, range processor electronics, power converters, and a display all which produce an x-y display of the terrain scanned by the laser signal wherein the X-axis is driven by a scanner position output and the Y-axis by range data.

BRIEF DESCRIPTION OF THE DRAWINGS

These and other objects of the invention will become readily apparent in light of the Detailed Description of the Preferred Embodiment and the attached drawings wherein:

FIG. 3 is another block diagram of the analog range processor electronics of the present invention and an analog X-Y display of its output.

FIG. 4 illustrates the various pulses produced by the present invention.

FIGS. 5a–5c are plots of the output of the present invention showing how the present invention detects various obstacles.

DETAILED DESCRIPTION OF THE PREFERRED EMBODIMENT

Figure 1:
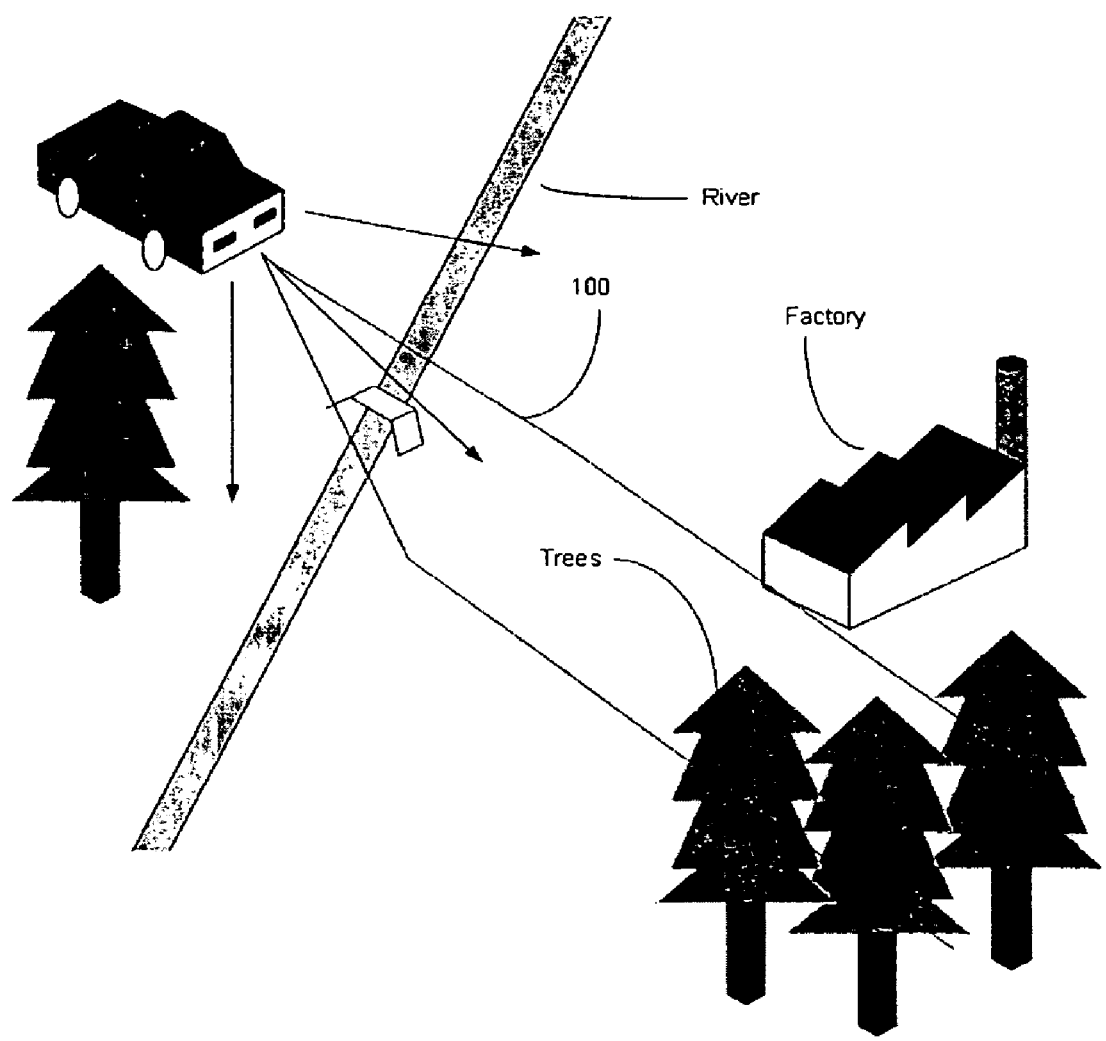
FIG. 1 is an illustration of the types of obstacles that are encountered by vehicles and must be avoided.

As depicted in FIG. 1, the operator of a combat vehicle encounters many natural and man-made obstacles particularly when he drives across unfamiliar terrain. In combat, he or she is required to make quick decisions to avoid these hazards while slowing down as little as possible. When this occurs at night, the change in environmental cues places additional demands on the vehicle operator, who is using a passive night vision devices as a driving aid. The LOAD sensor is intended to assist the operator by scanning the terrain ahead of the vehicle by sending out laser signals 100, detecting sudden range changes that could represent a hazard and providing the driver with a warning on his passive night vision imaging display.

The laser obstacle avoidance device (LOAD) sensor of the present invention is intended to be a warning aid to operators of vehicles when driving at night using passive night vision sensors. The sensor will allow drivers to more readily identify hazards and avoid them. Examples of such hazards are ditches, cliffs, boulders, large trees, steep inclines, buildings and other vehicles. Unlike autonomous land navigation systems, which are three-dimensional systems and hence imaging devices with significant processing required, the LOAD uses a man in the loop approach requiring simple one line scanning and processing. When a significant range discontinuity is detected in a scan line, the driver will be warned to visually examine the area before proceeding. The elevation of the scan line is controlled to keep the beam on the ground at a constant distance ahead of the vehicle. When the vehicle approaches a slope or goes over a hilltop, the scan line elevation is automatically raised or lowered to maintain the constant warning distance. If this elevation excursion exceeds a predetermined threshold, the operator will be warned of a possible hazard.

Transceiver/Optical Head

Figure 2:
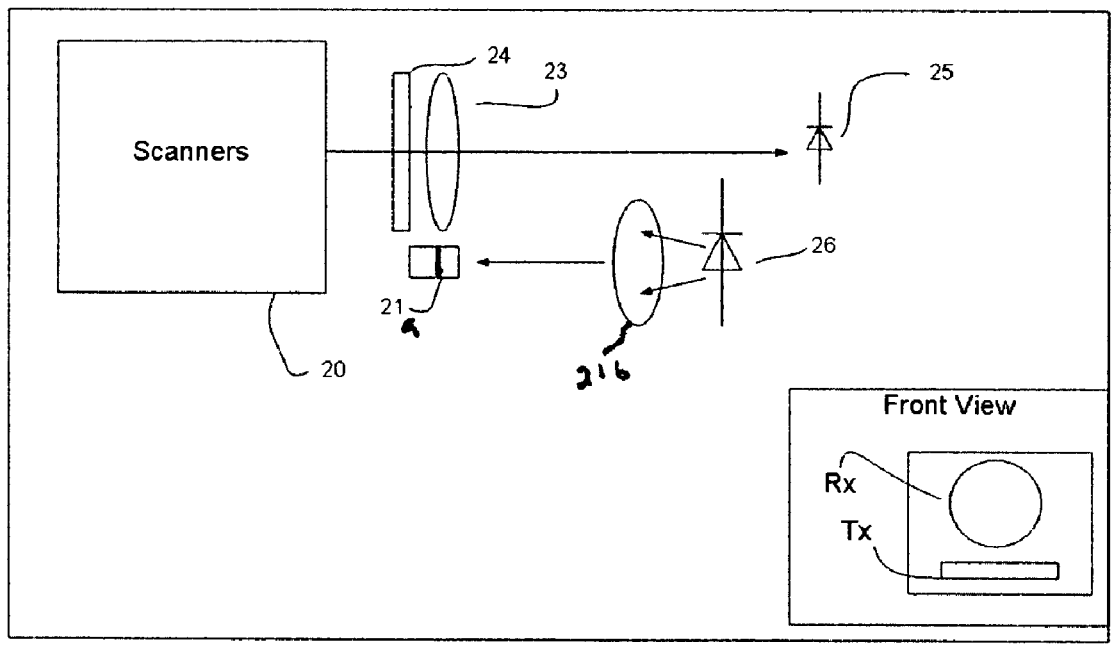
FIG. 2 is a schematic illustration of the optical head/transceiver of the present invention with an inset of the front view of the invention.

FIG. 2 is an schematic illustration of the optical head/transceiver of the present invention with an inset of the front view of the invention. As shown, a laser diode 26 produces a laser signal 100, which is transmitted through crossed cylindrical lenses 21a and 21b. The output signal is transmitted from the device, represented by the front view inset as $T_x$. The LOAD then receives the reflected laser signal through scanners 20, which will be discussed more thoroughly later. The scanners 20 then feed the reflected laser signal through a line filter 24 and a receiving lens 23, which is then ultimately fed to a detector 25 for processing and output to an analog display such as an oscilloscope (shown in FIG. 3).

The LOAD may be constructed from commercially available components. For example, the prototype of the present invention included a Power Spectra, Model 904-1, single bar transmitter, as the laser diode 26, which produces nominally 10 watts of peak power in a six nanosecond pulse at a wavelength of 904 nanometers. The laser is packaged in a TO-5-4H can that includes the pulse forming network and high current switch. Only a small 300 volt DC/DC converter and a single chip pulse generator are needed to operate at a pulse repetition rate of 8 kHz. The radiation is collected by a pair of crossed cylindrical lenses 21a and 21b to produce a 2 mm by 25 mm beam at the output aperture and a far field divergence of one by three milliradians. The transmitted energy was measured to be 27 nJ per pulse, corresponding to 4.5 watts peak power. The transmitter was evaluated by the Army Center for Health Promotion and Preventive Medicine and found to be Class I eye safe. Also included in the transmitter housing is a silicon PIN detector 25 that senses scattered radiation and produces a start pulse for the range processor.

The receiver included an Analog Modules, Model 756, Rangefinder Receiver which includes a silicon avalanche photodiode (APD) and amplified/threshold detection electronics that produce a TTL (transistor—transistor logic) level pulse when the reflected radiation returns. It also requires a high voltage DC/DC converter to properly bias the APD. This receiver module was available in our facility and designed to detect pulse of the order of 28 ns. As it is not optimized for the 6 ns diode laser pulse a new module with a 100 MHz bandwidth has been recently constructed and will be evaluated in the future. Even with this mismatch the collected data are very encouraging. The receiving optics consists of an optical band pass line filter 24 and a 25 mm diameter achromatic collecting, receiving lens 23.

The transmitter and receiver ($T_x$ and $R_x$) are contained in separate metal boxes (12×6×3 cm) to minimize electromagnetic interference and optical back scattering to the detector when the laser fires. Both have internal power converters and a regulator allowing them to be operated from 12 volt DC battery. As shown in FIG. 2, the use of crossed cylindrical lenses 21a and 21b is a more efficient use of space than conventional circular optics. This arrangement allows minimal separation of the optical axes of the two modules and the use of smaller scanning mirrors.

The scanners 20 are General Scanning, Model XY3037S with A1000 driver boards. A function generator chip drives the azimuth scanner up to 40 degrees at a rate of nominally 2.5 Hz. The elevation scanner can be either manually set or electronically controlled to maintain the beam spot on the ground at some distance ahead of the vehicle (to be described in the range processor section.) The assembled scanners and transceiver make up the optical head, which was mounted on the cab of a pick-up truck for data collection.

Control Electronics/Range Processor

A control electronics module is connected to the optical head by a five-meter cable. The control electronics include the scanner driver electronics, range processor electronics and power converters.

Start and stop pulses from the transceiver are shaped by comparators and one-shot pulse generators before being input into a J-K Flip-Flop. A block diagram of the analog range processor electronics is given in FIG. 3. As shown in FIG. 4, the output of the Flip-Flop goes high on receipt of the start pulse and begins to charge a capacitor. Arrival of the stop pulse sets the Flip-Flop low and accumulated charge on the capacitor is measured and then dumped in time for next start pulse. The charge on the capacitor is proportional to the range to the illuminated object, to first order. A variable gain op-amp (not shown) is employed to scale the voltage measurements of range to a convenient value (e.g. 0.1 volts/meter) for display, recording or digitization. An easily implemented laboratory display is simply an oscilloscope set in the X-Y mode. The X-axis is driven by the scanner position output and the Y-axis by the range data. The resulting trace is a range profile of the scanned line, which is refreshed at nearly video rates. In a laboratory experiment a range discontinuity of less than 10 cm could be detected at a distance of five meters.

Elevation Mirror Control

When crossing terrain with increasing slope, e.g. an approaching hill, a vehicle with a fixed elevation mirror will experience smaller measured range to the terrain and the operator will have less warning time if an obstacle is encountered. On the other hand, when going over the top of a hill the beam may not hit the ground until an obstacle has already been struck. To maintain a relatively constant warning time the average values of the range data for each scan line are used to control the elevation angle of the beam. The operator can adjust the controls so the average distance the sensor scans ahead of the vehicle is fixed, over most navigable terrain. This is simply implemented by comparing the range data with the threshold range set by the operator, low pass filtering the result and sending it to the elevation mirror control. If the measured range is larger than the threshold on an average, then the mirror will be driven lower; otherwise it will be elevated.

Data Collection

Figure 5A:
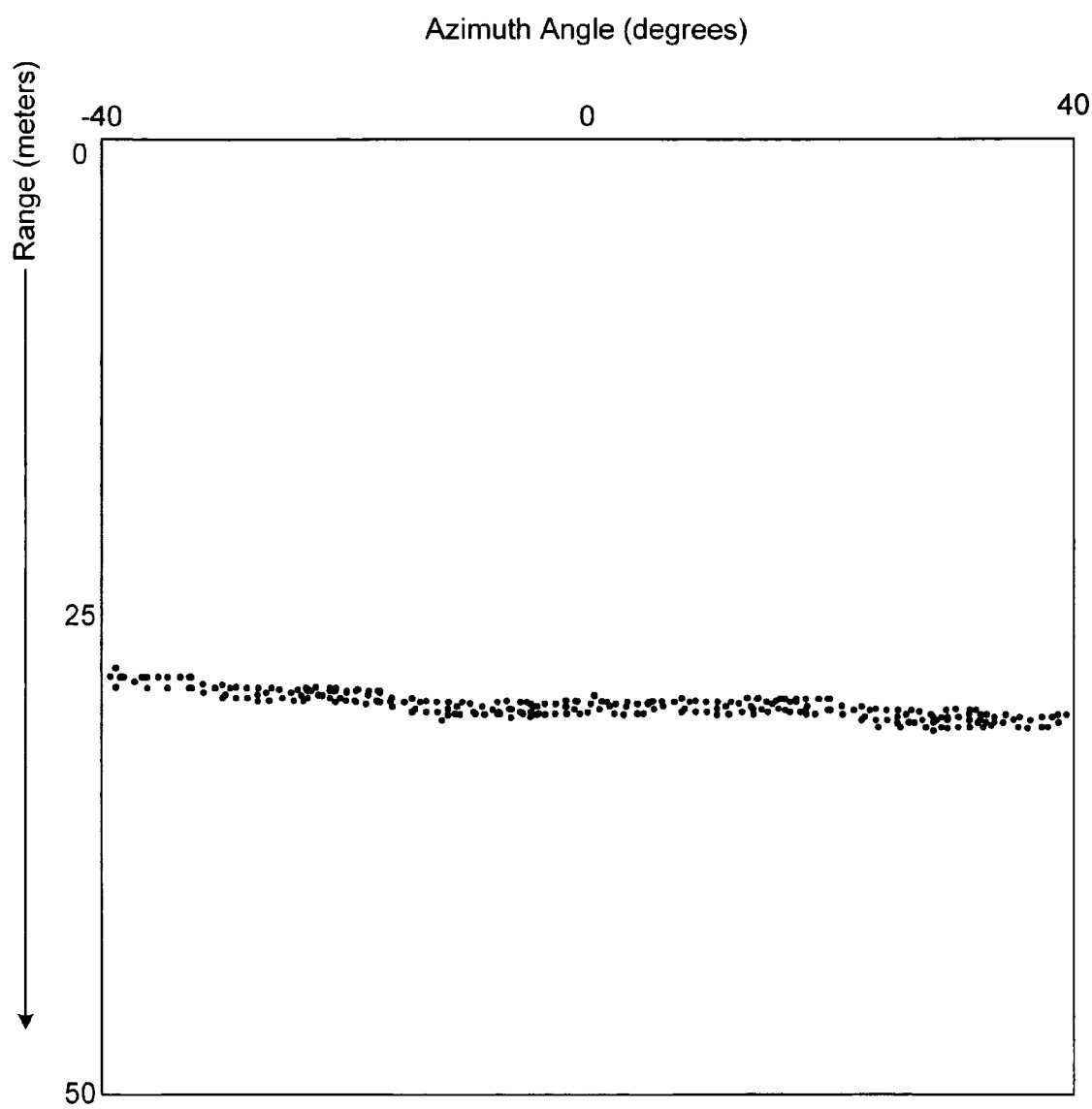

The LOAD sensor was mounted on the roof of a pick-up truck and driven over grass fields, gravel parking lots with posts, dirt roads with valleys on either side and paved roads with various hills and valleys on either side. A seven track analog tape recorder collected the range data, azimuth mirror position, elevation mirror position, IRIG time code and a voice track. An image of the test vehicle and some sample scan lines are presented in FIGS. 5a–c. In the data figures, the horizontal axis is the azimuth angle of the beam and vertical axis is range. Zero range is at the top of the scale with increasing range down from the top of the graph. It was found that some human observers more intuitively understand this inverted range presentation in that valleys on the side of the road go down (increasing range) while posts and hills go up (decreasing range) much like a contour line. FIG. 5a shows the trace of a gravel parking lot with no obstacles at a distance of 35 meters from the stationary vehicle, FIG. 5b shows the same parking lot with concrete posts (barriers to protect a water valve) in the filed of view and FIG. 5c shows the trace from a dirt road with drainage ditches on both sides. FIGS. 5b and 5c were collected with the vehicle in motion and the range spread among the scan lines is attributed to that motion and head mirror vibration. In a final system these data will be interpreted by a processor and will not be seen by the vehicle operator.

Hazard Detection Processor

A simple program was written to detect range discontinuities within a single scan line and to overlay warning marks on the digitized data on a computer screen. The next step in the processor development is to take the coordinates of the range discontinuity from the azimuth and elevation mirror position data and display a warning icon on the driver's image display.

In conclusion the present invention is a Class I, eye-safe, laser obstacle avoidance sensor has been constructed for vehicles. The system was designed to avoid hazards with emphasis simplicity and low cost. The LOAD system design also reflects the premise that the passive night vision sensor is the primary driving instrument. The driver will not see the raw data from the LOAD and processor will only warn the operator of possible hazards. The device has been employed in the field to collect data from natural and man-made objects. The collected data appear to be rich with information and easily processed. A simple, single scan line, range discontinuity detection program has been written and tested. The next step in the process is to interface the output of the processor with driver's display indicating the location of the potential hazard for the operator's closer scrutiny.

What is claimed is:

1. A laser obstacle avoidance device comprising:
   an optical head further comprising:
      a laser source which produces a laser signal,
      crossed cylindrical lenses through which the laser signal is transmitted;
      a transceiver including a receiving lens through which a reflected laser signal is received by the transceiver, a receiver and a line filter through which the reflected laser signal is filtered; and
      scanners which receive the reflected laser signal; and
   control electronics optically connected to the optical head, wherein the control electronics comprise scanner driver electronics, range processor electronics, power converters, and a display all which produce an x-y display of the terrain scanned by the laser signal wherein the X-axis is driven by a scanner position output and the Y-axis by range data,
   wherein start and stop pulses from the optical head are shaped by comparators and one-shot pulse generators before being input into a J-K Flip-Flop;
   wherein an output of the J-K Flip-Flop goes high on receipt of the start pulse and begins to charge a capacitor; and
   wherein an arrival of the stop pulse sets the J-K Flip-Flop low and an accumulated charge on the capacitor is measured and then dumped in time for a next start pulse.

2. The laser obstacle avoidance device of claim 1 wherein the charge on the capacitor is proportional to a range to a scanned object, to the first order.

3. The laser obstacle avoidance device of claim 1 wherein a variable gain op-amp in the control electronics is employed to scale the voltage measurements of range to a predetermined value for display, recording or digitization.

4. The laser obstacle avoidance device of claim 1 wherein a resulting trace is a range profile of the scanned line is refreshed at nearly video rates.

5. The laser obstacle avoidance device of claim 1 wherein the scanners comprise a silicon avalanche photodiode (APD) and amplified/threshold detection electronics that produce a TTL (pulse per second and pulse per minute) level pulse when the reflected radiation returns.

6. The laser obstacle avoidance device of claim 1 wherein the scanner includes a function generator chip which drives an azimuth of the scanner up to 40 degrees.

7. The laser obstacle avoidance device of claim 6 wherein the scanner can be either manually set or controlled to maintain the beam spot on the ground at some distance ahead of the laser obstacle avoidance device.

8. The laser obstacle avoidance device of claim 6 wherein the line filter is an optical band pass line filter and the receiving lens is a 25 mm diameter achromatic collecting, receiving lens.

* * * * *